Figure 1:
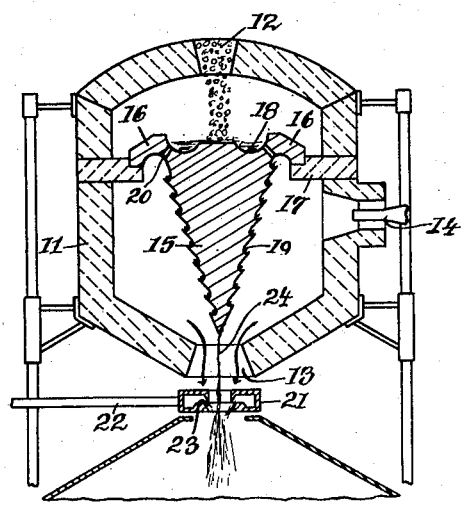

Aug. 20, 1940. P. MODIGLIANI 2,212,448
METHOD AND APPARATUS FOR THE PRODUCTION OF FIBERS FROM
MOLTEN GLASS AND SIMILAR MELTABLE MATERIALS
Filed Feb. 12, 1937 3 Sheets-Sheet 1

Inventor
Piero Modigliani
by Dewey & Cole
Attorneys

Fig. 3
Fig. 4
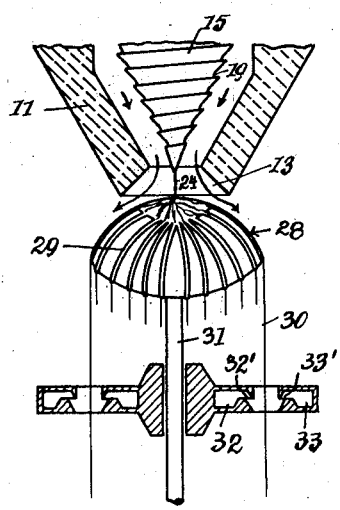
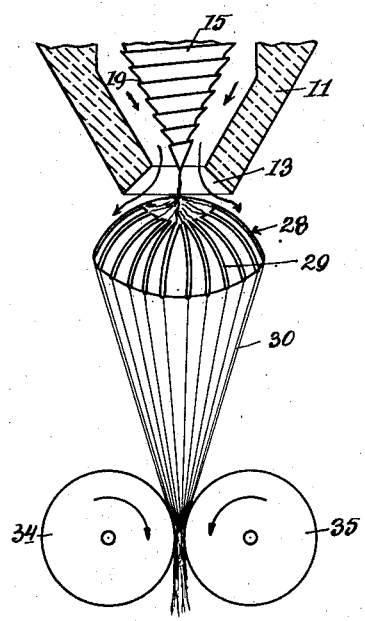
Fig. 5
Fig. 6
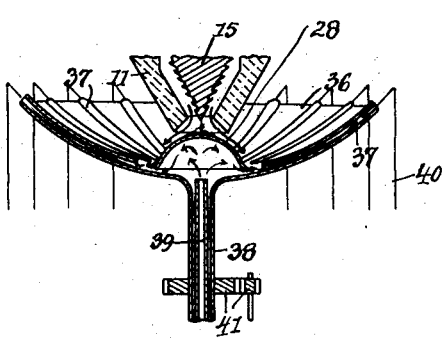
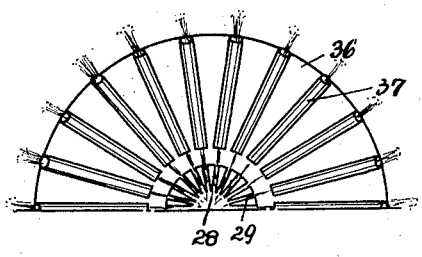
Inventor
Piero Modigliani
by Dreey & Cole
Attorneys Aug. 20, 1940.   P. MODIGLIANI   2,212,448
METHOD AND APPARATUS FOR THE PRODUCTION OF FIBERS FROM
MOLTEN GLASS AND SIMILAR MELTABLE MATERIALS
Filed Feb. 12, 1937   3 Sheets-Sheet 3
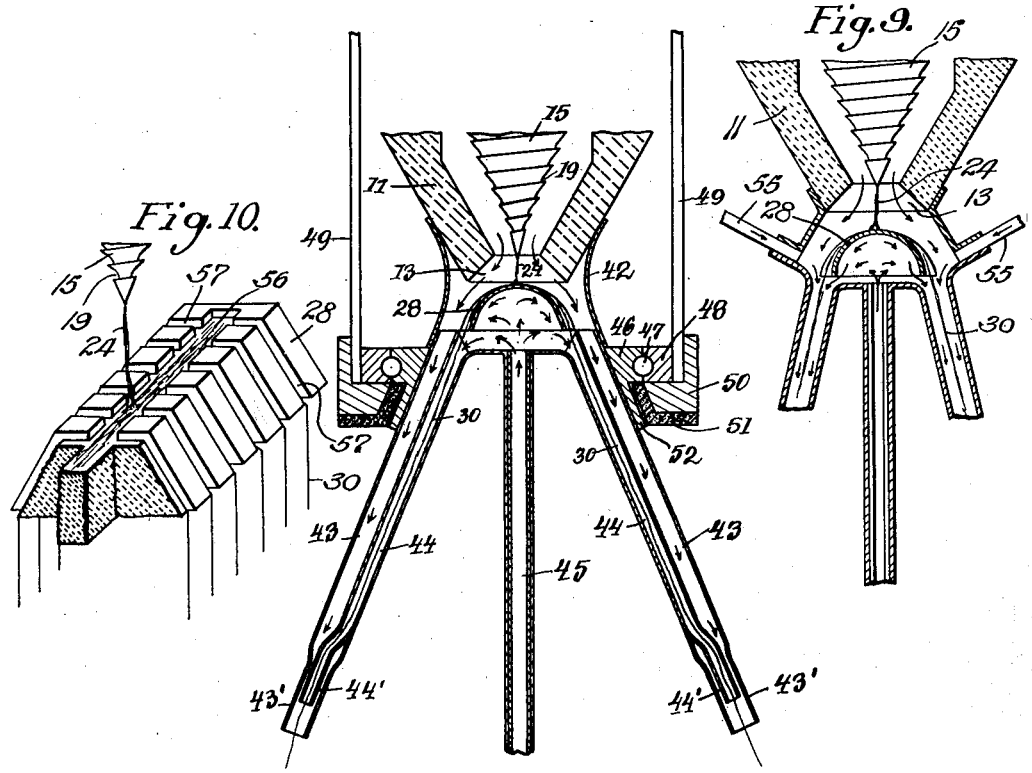
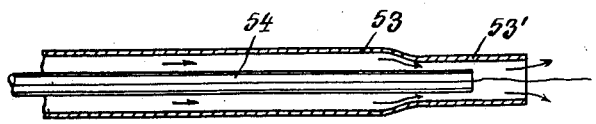

Patented Aug. 20, 1940

2,212,448

UNITED STATES PATENT OFFICE

2,212,448

METHOD AND APPARATUS FOR THE PRODUCTION OF FIBERS FROM MOLTEN GLASS AND SIMILAR MELTABLE MATERIALS

Piero Modigliani, Rome, Italy, assignor, by mesne assignments, to Owens-Corning Fiberglas Corporation, Toledo, Ohio, a corporation of Delaware Application February 12, 1937, Serial No. 125,512
In Luxemburg June 8, 1935

29 Claims. (Cl. 49—17)

My invention relates to a method and apparatus for the production of fine fibers from molten glass and similar meltable materials adapted to be used for spinning and weaving purposes.

The invention has more particularly reference to that method of producing glass fibers, in commercial use at the present day, which consists in flowing a small stream of molten glass and subjecting the same to the influence of a blast of superheated steam or other gas under pressure directed so relatively to the glass stream as to convert it into fibers.

The main object of the present invention is to provide a method and apparatus adapted for making glass fibers of greater fineness than hitherto possible with the commercial method above noted.

To this end, the method according to the invention assentially comprises flowing a small bare stream of molten material along a circuitous, preferably helical path, heating the stream while moving in this path to a temperature at least as high as or higher than that of the material forming the supply body for the stream, and then subjecting the stream to the means designed to draw it into fibers. In this way the glass is made highly fluent and thus better adapted to be drawn out to the desired fineness.

To further aid in obtaining fibers of great fineness, the invention provides for dividing the small stream of molten material prior to its conversion to fibers into a multiplicity of thin veins and subjecting these veins to the required drawing action.

Moreover, according to the invention, heat may be applied not only to the initial stream of molten material but also to the thin veins and to the fibers in formation until they have reached the desired fineness.

The conversion into fine fibers may be further aided in and accelerated according to the invention by subjecting the molten mass while being divided into the influence of centrifugal forces.

A preferred form of apparatus for carrying out the method according to the invention comprises a heating chamber having an outlet opening in its bottom and in its interior an inverted conical body provided in its top with a recess to hold a supply of molten material and on its outer surface with a helical groove extending from the upper portion of the cone to its end, the said groove serving to receive from the supply in the said recess a small stream of molten material which while flowing down through the helical groove is intensively heated by the hot gases surrounding the cone so that it is delivered at the lower end of the latter in a highly fluent condition. The fluent stream may then be subjected to any convenient drawing means, preferably a blast of superheated steam or other gas, or it may be delivered to a distributor, such as a mushroom-shaped body with radial grooves in its surface, by which the stream is divided into a plurality of thin veins which are subjected to a drawing and other treatments as will hereinafter be more fully described.

Figure 2:
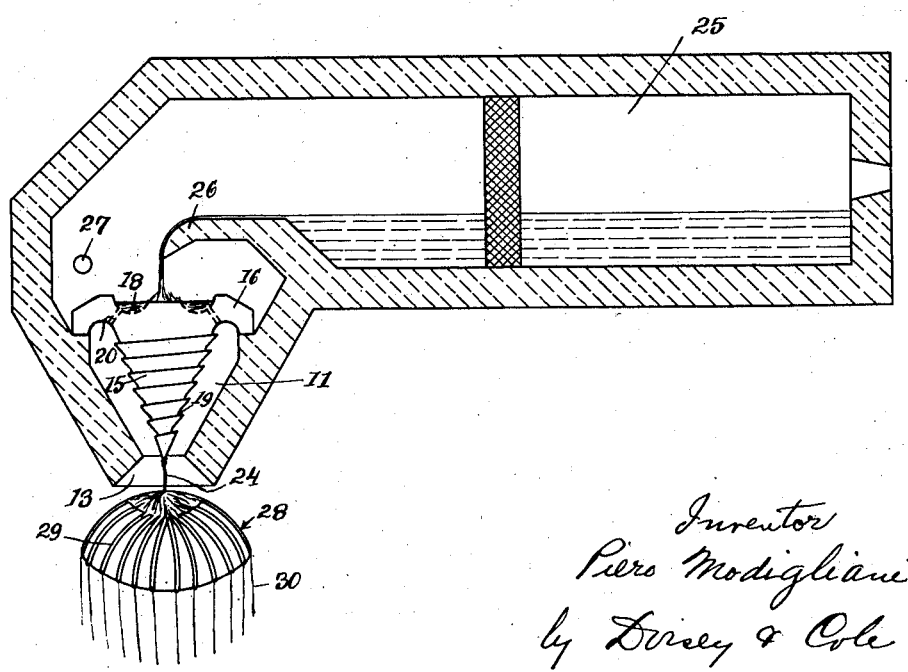

The invention will be more readily understood with reference to the accompanying drawings in which:

Fig. 1 is a vertical section through one form of apparatus according to the invention, Fig. 2 is a similar section through an apparatus combined with a melting furnace and a distributor, Fig. 3 is a fractional section illustrating the combination of heating chamber, distributor and blower, Fig. 4 is a section similar to Fig. 3, showing other drawing means, Fig. 5 is a detail section showing a distributor and drawing means of particular construction, Fig. 6 is a plan view of a part of the arrangement shown in Fig. 5, Fig. 7 is a section of a modified form of distributing and drawing device, Fig. 8 is a sectional view of a detail, Fig. 9 is a diagrammatic section of another modified form of apparatus, and Fig. 10 is a perspective of another form of distributor, some parts being broken away.

Referring first to Fig. 1, the numeral 11 designates a heating chamber with refractory walls into which raw material, such as cullet of glass, is introduced through an opening 12. The side walls or, as shown, the bottom walls converge downwardly and form a central outlet opening 13. The chamber 11 is heated by means of burners 14 or by any other suitable means. Disposed in the interior of the chamber 11 is an inverted conical body 15 supported through wings 16 on an annular bracket 17 forming part of or mounted in the walls of the chamber. The cone is provided in its top with a recess or cavity 18 designed to receive the raw material for being melted therein. The cone 15 has on its outer surface a continuous groove 19 extending helically around the cone body from beneath the wings 16 to the end of the cone. Channels or ports 20 connect the recess 18 with the helical groove 19. Arranged in axial register with the cone 15 and the outlet opening 13 below the latter is a blower 21, preferably comprising an annular chamber to which steam or gas under pressure is transmitted through a pipe 22 from any suitable source. The blower has a central passageway and its inner wall is provided with an annular slot or a series of openings 23 surrounding the central passageway of the blower.

The compartments above and below the annular bracket 17 are in open communication through spaces left between the wings 16. As the heating chamber is closed except for the outlet opening 13 the hot gases are compelled to exhaust through this opening under a certain pressure. The cullet introduced into the chamber is melted in the recess 18 from which a certain quantity of molten material constantly flows through the channels 20 into the helical groove 19, through which it flows down around the cone in a small bare stream 24 which is delivered from the cone end through the opening 13. Thence, the stream of molten material is passed through the blower 21. The blast of superheated steam or gas under pressure issuing through the slot 23 blows the stream to fine fibers, as is well-known in the art. The fibers produced are carried off and matted or otherwise treated in any approved manner. On its prolonged way through the helical groove 19 the small stream of molten material is exposed to the intense heat of the hot gases or flames surrounding the cone 15 and is gradually heated to a temperature higher than that of the supply of material contained in the recess 18. The application of this intense heat causes the stream to acquire a highly fluent condition which allows the formation of fibers of very great fineness. The desired effect is further secured by the hot gases which exhaust through the outlet opening 13 and go on acting on the stream 24 until it is converted into fibers.

According to Fig. 2, the heating chamber 11 is combined with a glass melting and refining tank 25, from which a thin stream or band of molten mass flows over a ridge 26 to the recess 18 in the top of the conical body 15, where it accumulates and is further heated. The heating gas or flame is supplied to the chamber 11 through the conduit 27. Also in this case the hot gases are caused to exhaust under considerable pressure through the outlet 13 formed at the lower end of the converging side walls of the chamber 11. The superheated small stream of highly fluent material 24 is delivered by the cone 15 on to a distributor 28, consisting of a mushroom-shaped body having a plurality of radial grooves 29. On this body the stream 24 distributes into a multiplicity of thin veins 30 each of which flows through one of the radial grooves 29 to the margin of the mushroom 28, where they are delivered for being subjected to an appropriate drawing action. This drawing action may be exerted by means such as illustrated in Figs. 3 and 4.

According to Fig. 3, there is arranged underneath the distributor 28 about a shaft 31 carrying the distributor a hollow disc 32 which is surrounded concentrically by a hollow ring 33. Superheated steam or gas under pressure is supplied to the members 32 and 33 by suitable conduits (not shown). The disc 32 and the ring 33 are spaced apart to form a passageway for the thin veins of molten material delivered from the grooves 29 of the distributor 28. The disc 32 and ring 33 have slots 32' and 33', respectively, through which blasts of steam or gas are directed downwardly against the veins 30 substantially in the direction of flow of the veins, these blasts drawing the veins to fibers of minute fineness. If desired, the distributor 28 may be rotated as may also the ring 33. These rotary movements may take place at equal or different speeds.

According to Fig. 4, the veins are carried off and drawn out by a pair of cylinders 34, 35 which rapidly revolve in opposite directions as indicated by the arrows. The cylinders may or may not be in contact with each other. The pivots of one or the other or of both cylinders may be adjustable and preferably are under spring action to exert a certain yieldable pressure on the fibers passing between them. The cylinders may be of large diameter and have a rough surface to induce abundant air.

In the construction illustrated by Figs. 5 and 6, the mushroom shaped distributor 28 has associated with it a concave dish 36 provided with open-ended radial tubes or channels 37 corresponding in number to the number of grooves 29 on the distributor so that each tube or channel receives a vein of material or filament from the grooves 29. The dish 36 is carried by a hollow shaft 38 through which extends a tube 39 for supplying steam or other gas. The tube terminates below the concave side of the distributor 28 by which the steam emitted by the tube is led into and through the tubes exerting therein a drawing action on the filaments 40 which are driven out through the outer ends of the tubes, whereupon they move downwards by their own weight. At the same time the hot gases exhausted through the outlet 13 flow over the surface of the distributor 28 through and along the tubes 37, thus keeping the filaments at a suitable temperature to allow further attenuation of the same. The conversion of the stream 24 and the veins 30 into fine fibers may be aided by imparting rotation to the dish 36 and distributor 28, which may be performed by means of gears 41 coupled with the shaft 38.

With the embodiment illustrated by Fig. 7, the hot gases exhausted through the outlet opening 13 are guided by an envelope 42 over the surface of the distributor 28 into tubes 43 extending radially from the distributor in a downwardly diverging position. These tubes 43 contain each a tube 44 of smaller diameter which form kind of continuations of the radial grooves 29 of the distributor 28. Steam or other hot gas under pressure is supplied by a pipe 45 which opens below the distributor 28, by which the gas is deflected into the small tubes 44 in which the gas streams exert a drawing action on the veins or filaments 30 passing through the tubes. The hot gases moving along the small tubes 44 in the larger tubes 43 keep the filaments at the desired temperature and plasticity. The ends 43' of the tubes 43 may be made of reduced diameter and the small tubes 44 bent so as to extend by their ends 44' axially through the reduced ends 43'. In this way a narrowed passage is formed for the hot gases flowing through the pipes 44 near the ends thereof, whereby an increased speed is imparted to gases producing an ejection effect which aids in drawing out the filaments moving through the small tubes 44. In addition to these forces a centrifugal force may be applied by imparting rotation to the distributor 28 and assemblage of pipes 43, 44 or to the entire structure. To this end, the pipe 45 may be formed and mounted as a shaft of rotation may be imparted by any suitable means. In order to allow rotating the whole apparatus, the assemblage of tubes 43, 44 is provided with a ring 46 forming the inner race of a ball racing 47 the outer race 48 of which is fastened to a frame 49 carrying the heating chamber 11. This frame also carries an annular rim 50 forming a pulley to which rotation may be imparted by appropriate means (not shown). This pulley is provided with a ring 51 of suitable material adapted to act by friction on an annular extension 52 of the ring 46 to transmit rotation to the assemblage of tubes 43, 44 and the distributor 28.

Fig. 8 illustrates a pair of tubes 53 and 54 similar to the tubes 43, 44. In this case the small tube 54 extends axially through the larger tube 53 which has a reduced end 53' to produce the said ejection effect. Sets of tubes 53, 54 may be arranged radially in a horizontal plane about the distributor 28 instead of radially inclined as shown in Fig. 7.

The construction according to Fig. 9 is a modification of the construction illustrated by Fig. 7. It possesses tubes 55 for the supply of additional currents of gas aiding in drawing the veins 30 to fine fibers. The distributor 28 may be either stationary or rotatable.

Fig. 10 shows another form of distributor 28, consisting of a truncated prismatic body having in its top a small cavity 56 to hold a certain supply of molten material and on its sides series of channels 57 which extend parallelly downward in spaced relation. A thin vein of molten material flows from the cavity 56 through each of the channels 57 yielding a filament 30. The groups of filaments delivered by the distributor may be drawn out by a pair of cylinders, such as described with relation to Fig. 4. The distributor according to Fig. 10 due to the large number of dividing channels results in an increased production of fine filaments per unit of time.

The application of the heat to the molten material while flowing in a bare stream includes the advantage of permitting a gradual reheating which is not possible with devices in which the streams of molten material flow in closed sections.

The invention is not limited to the described conical shape of the body around which the small stream of molten material is led through the heating chamber, but such body may have any other appropriate shape as long as it serves the purpose of the invention.

Various modifications may be resorted to within the scope of the invention.

What I claim is:

1. The method of producing fibers from molten glass and similar meltable material, which comprises flowing a small stream of molten material from a supply body of said material along a circuitous path, heating said stream while moving on said path to a temperature at least as high as that of the material forming the supply body, and subjecting the heated stream to the action of drawing means for attenuating it to fine fibers.

2. The method of producing fibers from molten glass and similar meltable material, which comprises flowing the molten material from a supply body of said material in a thin bare stream along a helical path, heating said stream while moving on said path to a temperature higher than that of the material forming the supply body, and subjecting the heated stream to the action of drawing means for attenuating it to fine fibers.

3. The method of producing fibers from molten glass and similar meltable material, which comprises flowing the molten material from a supply body of said material in a small bare stream along a helical path, heating said stream while moving on said path to a temperature higher than that of the material forming the supply body, dividing said heated stream into a plurality of thin veins, and subjecting these veins of molten material to the action of drawing means.

4. The method of producing fibers from molten glass and similar material, which comprises flowing a small bare stream of molten material from a supply body of said material, heating this stream to a temperature higher than that of the material forming the supply body, dividing the heated stream into a plurality of thin veins, applying further heat to these veins of material and subjecting them to the action of drawing means.

5. The method of producing fibers from molten glass and similar meltable material, which comprises flowing the molten material from a supply body of said material in a small bare stream along a helical path, heating said stream while moving on said path to a temperature higher than that of the material forming the supply body, dividing said heated stream into a plurality of thin veins, applying further heat to these veins of material and subjecting them to the action of means for drawing them into fine fibers.

6. The method of producing fibers from molten glass and similar meltable material, which comprises flowing the molten material from a supply body of said material in a thin bare stream along a helical path, heating said stream while moving on said path to a temperature higher than that of the material forming the supply body, and subjecting said stream to a blast of gas acting to reduce the stream to fine fibers.

7. The method of producing fibers from molten glass and similar meltable material, which comprises flowing a small bare stream of molten material from a supply body of said material, heating said stream to a temperature higher than that of the material forming the supply body, dividing the heated stream into a plurality of thin veins, and subjecting these veins of material to a blast of gas in a manner to exert a drawing action on the same.

8. The method of producing fibers from molten glass and similar meltable material, which comprises flowing a small bare stream of molten material from a supply body of said material, heating said stream to a temperature higher than that of the material forming the supply body, dividing the heated stream into a plurality of thin veins, applying further heat to these veins of material, subjecting the hot veins to a drawing action and allowing them to solidify to form thin fibers, and twisting these fibers together to form fibrous strands.

9. The method of producing fibers from molten glass and similar meltable material, which comprises flowing a small bare stream of molten material from a supply body of said material, heating said stream to a temperature higher than that of the material forming the supply body, dividing the heated stream into a plurality of thin veins, and subjecting these veins of material to a blast of gas and to the influence of centrifugal forces in a manner to exert a drawing action on the thin veins converting them into fine fibers.

10. In an apparatus for the production of fibers from molten glass and similar meltable material, in combination a heating chamber, an outlet opening in the bottom of said chamber, an inverted conical body in the heating chamber spaced from the walls of the chamber, a recess in the top of said body to hold a supply of molten material, a helical groove on the outer surface of the conical body extending from the upper portion substantially to the lower end of the body, channels of communication between the recess in the cone top and the helical groove in the cone surface with these channels adapted to deliver a small stream of molten mass to the helical groove in which the stream is caused to flow down around the cone to the lower end thereof where it is delivered through the outlet of the heating chamber, and means below the said outlet for drawing the stream of molten mass into fine fibers.

11. In an apparatus for the production of fibers from molten glass and similar meltable material, in combination a heating chamber, an outlet opening in the bottom of said chamber, means in the heating chamber for conveying a small bare stream of molten material on a circuitous path from the upper portion of the chamber to and through the said outlet opening, a distributor below the said outlet opening adapted to receive and divide the small stream of molten material into a plurality of thin veins, and means for exerting a drawing action on these thin veins of molten material.

12. In an apparatus for the production of fibers from molten glass and similar meltable material, in combination a heating chamber, an outlet opening in the bottom of said chamber, means in the heating chamber for conveying a small bare stream of molten material on a circuitous path from the upper portion of the chamber to and through the said outlet opening, a mushroom-shaped body below the said outlet opening whereon to deliver the stream of molten material, radial grooves in the top of the mushroom through which the stream of molten material is allowed to flow in a divided form as thin veins of material to the margin of the mushroom, and means for exerting a drawing action on the thin veins of molten material delivered at the margin of the mushroom.

13. In an apparatus for the production of fibers from molten glass and similar meltable material, in combination a heating chamber, an outlet opening in the bottom of said chamber, means in the heating chamber for conveying a small bare stream of molten material on a circuitous path from the upper portion of the chamber to and through the said outlet opening, a truncated prismatic body below the said outlet opening, a recess in the top of the prismatic body adapted to receive the stream of molten material, parallel spaced grooves on the lateral sides of the prismatic body wherethrough to allow the flow of thin veins of molten material from the recess in the top of the prism, and means for exerting a drawing action on the thin veins of molten material delivered from the prismatic body.

14. In an apparatus for the production of fibers from molten glass and similar meltable material, in combination a heating chamber, an outlet opening in the bottom of said chamber, an inverted conical body in the heating chamber spaced from the walls of the chamber, a recess in the top of said body to hold a supply of molten material, a helical groove on the outer surface of the conical body extending from the upper portion substantially to the lower end of the body, channels of communication between the recess in the cone top and the helical groove in the cone surface with these channels adapted to deliver a small stream of molten material to the helical groove in which the stream is caused to flow down around the cone to the lower end thereof and through the outlet opening of the heating chamber, a mushroom-shaped body below the outlet opening whereon to deliver the stream of molten material, radial grooves in the top of the mushroom through which the stream of molten material is allowed to flow in a divided form as thin veins of material to the margin of the mushroom, and means for exerting a drawing action on the thin veins of molten material delivered at the margin of the mushroom.

15. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, and means for causing hot gases under pressure to act on the thin veins of material while flowing through and beyond the grooves of the distributor substantially in the direction of flow of the veins.

16. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, means for causing hot gases under pressure to act on the thin veins of material while flowing through and beyond the grooves of the distributor substantially in the direction of flow of the veins, and means for imparting rotation to the distributor.

17. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, a series of radially disposed tubes around the distributor, each tube arranged in prolongation of each of the grooves of the distributor and adapted to receive one of the veins of molten material, and means for supplying gas under pressure to the said tubes for passing it through the same in the direction of progression of the veins in the tubes.

18. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, a series of radially disposed tubes around the distributor, each tube arranged in prolongation of each of the grooves of the distributor and adapted to receive one of the veins of molten material, other tubes surrounding the first-said tubes in spaced relation thereto, means for supplying gas under pressure to the first-said tubes and passing it through the same in the direction of progression of the veins in the tubes, and means for supplying hot gases under pressure to and through the other tubes.

19. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, a series of radially disposed tubes around the distributor, each tube arranged in prolongation of each of the grooves of the distributor and adapted to receive one of the veins of molten material, other tubes surrounding the first-said tubes in spaced relation thereto and extending with their ends beyond the ends of the first-said tubes with those ends having a reduced diameter, means for supplying gas under pressure to the first-said tubes and passing it through the same in the direction of progression of the veins in the tubes, and means for supplying hot gases under pressure to and through the other tubes.

20. In an apparatus for the production of fibers from molten glass and similar meltable material, in combination a heating chamber, an outlet opening in the bottom of said chamber, an inverted conical body in the heating chamber spaced from the walls thereof, a recess in the top of said body to hold a supply of molten material, a helical groove on the outer surface of the conical body adapted to lead a small bare stream of molten material to the lower end of the cone to be delivered therefrom through the outlet opening of the heating chamber, a mushroom-shaped distributor with radial grooves below the said outlet opening, the said radial grooves being adapted to receive each a thin vein of molten material and cause it to flow to the margin of the distributor, a series of radially disposed tubes around the distributor, each tube arranged in prolongation of each of the grooves of the distributor and adapted to receive one of the veins of molten material, other tubes surrounding the first-said tubes in spaced relation thereto and extending with their ends beyond the ends of the first-said tubes with those ends having a reduced diameter, means for supplying gas under pressure to the first-said tubes and passing it through the same in the direction of progression of the veins in the tubes, means for supplying hot gases under pressure to and through the other tubes, means for rotating the distributor and means for rotating the system of tubes about the vertical central axis of the apparatus.

21. The method of producing fibers from molten glass and similar meltable material which comprises flowing a small bare stream of molten material from a supply body of said material along a circuitous path, directing heat upon the bare stream of material to heat the same to a temperature at least as high as that of the material forming the supply body, and drawing the heated stream into fine attenuated fibers.

22. The method of producing glass fibres which consists in delivering a small bare stream of glass from a supply body, dividing the stream under the influence of gravity into a plurality of thin veins and subjecting the veins to attenuation to draw them into fine fibres.

23. The method of producing glass fibres which consists in delivering a small bare stream of glass from a supply body, heating the stream to an extent sufficient to maintain it in a high state of fluidity, dividing the stream under the influence of gravity into a plurality of thin veins and subjecting the veins to attenuation to draw them into fine fibres.

24. The method of producing glass fibres which consists in delivering a small bare stream of glass from a supply body, dividing the stream under the influence of gravity into a plurality of thin veins and subjecting the veins to the action of centrifugal force to draw them into fine fibres.

25. The method of producing glass fibres which consists in flowing a body of glass downwardly along converging walls of a supporting member so as to deliver from the lower end thereof a small bare stream of glass, dividing the stream under the influence of gravity into a plurality of thin veins and reducing them into fine fibres.

26. The method of producing glass fibres which consists in delivering a small bare stream of glass from a supply body, dividing the stream under the influence of gravity into a plurality of thin veins and subjecting the veins to attenuation at a point remote from the division of the stream to draw the veins into fine fibres.

27. The method of producing glass fibres which consists in delivering a small bare stream of glass from a supply body, dividing the stream under the influence of gravity into a plurality of thin veins, and subjecting the veins to the action of centrifugal force at a point remote from the division of the stream to draw them into fine fibres.

28. The method of producing glass fibres which consists in feeding a stream of molten glass downwardly upon a convex surface, momentarily husbanding a glass upon the surface and distributing the same laterally, converting the glass so distributed into a plurality of thin veins moving outwardly and downwardly upon said surface and applying a tractive force to said veins to draw them into fine threads.

29. The method of producing glass fibres which consists in flowing a body of glass first helically and then vertically downward in the form of a small stream of glass and thereafter attenuating the same to produce a plurality of glass fibres each of less diameter than the said stream.

PIERO MODIGLIANI.